United States Patent Office 3,062,824
Patented Nov. 6, 1962

3,062,824
PREPARING VINYLPYRIDINE-N-OXIDES AND CERTAIN DERIVATIVES THEREOF
Jesse T. Dunn, Charleston, and Donald L. Heywood, South Charleston, W. Va., assignors to Union Carbide Corporation, a corporation of New York
No Drawing. Filed Oct. 12, 1959, Ser. No. 845,655
4 Claims. (Cl. 260—295)

This invention relates in general to unsaturated heterocyclic nitrogen oxides and a process for their preparation. More particularly this invention relates to a process for the preparation of vinylpyridine N-oxides and derivatives thereof.

Heretofore, vinylpyridine N-oxides have been prepared by a three step process reported in the literature which involves preparing the pyridineethanol N-oxides, heating the pyridineethanol N-oxides in the presence of caustic or concentrated hydrochloric or sulfuric acids, or by passing the vapors of the pyridineethanol N-oxide through a non-acid dehydrating catalyst maintained at a dehydrating temperature and condensing the vinylpyridine N-oxide formed. These vinylpyridine products are usually obtained in relatively low yields and as such are economically unattractive to produce commercially by the aforesaid process. Additionally, the resulting vinylpyridine N-oxides which have boiling points above 100° C. at a pressure of 5 millimeters of mercury are usually stored in the liquid form providing that proper measures are taken to inhibit polymerization. It is well known that the unsaturated polymerizable heterocyclic nitrogen compounds in the liquid state tend to polymerize during storage and under certain handling conditions. This results not only in a loss of the pure monomer but the undesirable presence of a polymer which may adversely affect subsequent reactions if not removed. Thus, it is usually necessary to add one of several polymerization inhibitors currently available to the industry.

Accordingly, one or more of the following objects will be achieved by the practice of the instant invention. It is an object of the present invention to provide a process for the preparation of vinylpyridine N-oxides, and derivatives thereof. Another object of the present invention is to provide a process wherein vinylpyridine N-oxides can be produced in a simple one-step reaction from the corresponding vinylpyridine. A further object of the instant invention is to provide a novel method for preparing the vinylpyridine N-oxides as novel crystalline dihydrates and salts which can be stored uninhibited for extended periods of time without deterioration or polymerization. A still further object is to provide a novel process for preparing vinylpyridine N-oxides which do not suffer from the disadvantages of methods heretofore available. Another object of the present invention is to provide a process whereby 2-methyl-5-vinylpyridine N-oxide can be produced in high yields. These and other objects will become readily apparent to those skilled in the art in the light of the teachings herein set forth.

In its broad aspect, this invention is directed to a process for the preparation of vinylpyridine N-oxides, and derivatives thereof. These vinylpyridine N-oxide compounds are useful as chemical intermediates in the preparation of various pyridine derivatives. The monomer is instrumental in the preparation of copolymers such as the higher acrylate estervinylpyridine N-oxide copolymers which are themselves attractively suitable for use as oil additives. Additionally, copolymers prepared from vinylpyridine N-oxides are adaptable where antistatic, coagulant, or water solution applications are desired. The vinylpyridine N-oxides can also be polymerized with other monomers such as butadiene, styrene, acrylonitrile and the like to form elastomers having useful properties.

In accordance with one embodiment of the present invention, the vinylpyridine N-oxides are prepared by a process which comprises reacting a vinylpyridine with an organic oxidant. The following general equation illustrates the novel process of the present invention:

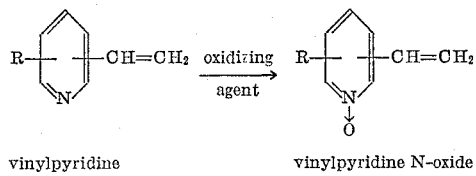

wherein R represents hydrogen or a lower alkyl group. Thereafter, the reaction product can be isolated as the oxide, as indicated above, or as the dihydrate or salt of a suitable organic acid as indicated by the following formula:

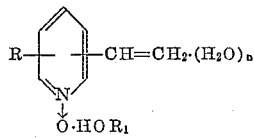

wherein R is a member selected from the class consisting of hydrogen or a lower alkyl group; $R_1$ is a member selected from the class consisting of hydrogen, aryl and acyl groups; and $n$ has a value of from 0 to 1. Preferred compounds are those represented by the above formulae wherein R contains from 1 to 6 carbon atoms and $R_1$ is a member selected from the class consisting of hydrogen, picryl and acetyl groups and contains from 1 to 12 carbon atoms and more preferably 1 to 6 carbon atoms. It is to be understood that in the above formula directed to the dihydrate or salt, the provision must be included that when $n$ equals 1, $R_1$ must be hydrogen and when $n$ equals 0, $R_1$ is aryl or acyl. Also preferred are those compounds represented by the following formulae and directed respectively to the acetate, dihydrate and picrate derivatives:

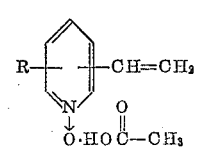

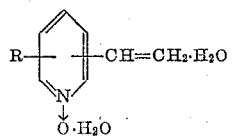

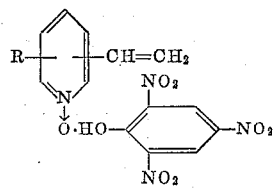

wherein R is as previously indicated.

Illustrative of the vinylpyridine which can be oxidized to the corresponding vinylpyridine N-oxides are 2-vinylpyridine, 2-methyl-5-vinylpyridine, 5-ethyl-2-vinylpyridine, 3-vinylpyridine, 4-vinylpyridine, and the like. It should be noted that these compounds are only illustrative of the broad class of vinylpyridines which can be oxidized by the process of the present invention. In isolating the vinylpyridine N-oxides from the reaction mixture in the form of hydrates or organic acid salts, it may be necessary in some instances to include an inhibitor to prevent possible polymerization of the vinylpyridine N-oxide.

Any suitable oxidizing agent can be employed which will effect the reaction illustrated above without adversely affecting other constituents in the molecule. The preferred oxidizing agents used in the practice of this invention are largely organic peroxides, hydroperoxides, and the like. Particularly preferred are the peracids such as perpropionic, perbenzoic, peracetic, monoperphthalic, or peroxides such as acetaldehyde monoperacetate, benzoyl peroxide, and the like. The choice of oxidizing agent will largely be determined by economic factors as well as the chemical efficiency of the particular agent. Various solvents may be employed in the practice of this invention as a medium for the oxidizing agent, the major requirement being that the oxidizing agent is soluble therein and unreactive with the medium. Typical solvents which may be employed are ethyl acetate, water, acetic acid, methylene chloride, acetone, chloroform and the like.

Molar ratios of oxidizing agent to the vinylpyridine can vary from about 0.5 to about 2.0 and preferably from about 1.0 to about 1.5. Ratios above and below these amounts can equally as well be employed but are less preferred. The preferred temperatures at which the oxidation of the vinylpyridines is effected are temperatures in the range from about −20° C. to about 50° C. although temperatures above and below these ranges can also be employed.

The vinylpyridine N-oxides formed by the process of this invention can be isolated and recovered as the oxides, hydrates or salts thereof. For example, when a peracetic acid solution was added dropwise to a solution of 2-methyl-5-vinylpyridine maintained at 25° C. the 2-methyl-5-vinylpyridine N-oxide was formed as the reaction product and recovered by conventional distillation methods. However, due to the tendency of the N-oxide to undergo polymerization, it is more preferable to recover the 2-methyl-5-vinylpyridine N-oxide as the dihydrate or salt. This may be accomplished by concentrating the solution containing the N-oxide after oxidation is complete and allowing the solution to stand in the cold. Thereafter, upon being seeded, crystals of 2-methyl-5-vinylpyridinium N-oxide acetate deposited and were removed by filtration. Other salts of lower alkanoic acids can be prepared in a similar manner from the filtrate, such as the propionates, butyrates, and the like, although the picrates and acetates are preferred. The dihydrate can be prepared from the 2-methyl-5-vinylpyridinium N-oxide acetate by treatment with an aqueous alkaline hydroxide such as a sodium hydroxide solution and recrystallizing the product from cold water. Other salts such as the picrate above can also be prepared from the dihydrate.

The starting materials of the present invention, the vinylpyridines, can be prepared by methods known to the art. For example, 5-ethyl-2-vinylpyridine and 2-methyl-5-vinylpyridine are derived from aldehydecollidine(5-ethyl-2-methylpyridine) which in turn can be prepared from paraldehyde and ammonia. Other vinylpyridines can be prepared by catalytic dehydration of the corresponding (2-hydroxyethyl)pyridine.

The following examples are given to illustrate the best mode presently contemplated for the preparation of the compounds of this invention.

EXAMPLE I

*Preparation of 5-Ethyl-2-Vinylpyridine N-Oxide*

An acetone solution containing 29.4 grams (0.39 mole) of peracetic acid was added dropwise to 53.2 grams (0.40 mole) of 5-ethyl-2-vinylpyridine (boiling point 84.5° C. at 10 millimeters of pressure) over a period of one-half hour. The temperature was maintained at 25° C. during the addition of the peracetic acid and for an additional four and one-half hours thereafter by cooling with ice-water. At the end of this time, titration for peracetic acid indicated that the reaction was 89.8 percent complete. The reaction mixture was stripped of volatile components by codistillation with ethylbenzene. The concentrated residue of 5-ethyl-2-vinylpyridine N-oxide when distilled polymerized to a tan solid, poly(5-ethyl-2-vinylpyridine N-oxide).

EXAMPLE II

*Preparation of 2-Methyl-5-Vinylpyridine N-Oxide and Isolation as the Picrate and Acetate*

An ethyl acetate solution containing 83.6 grams (1.1 moles) of peracetic acid was added dropwise over a period of two hours to 119 grams of 2-methyl-5-vinylpyridine (1.0 mole) having a refractive index of $n\ 30/D = 1.5396$. The solution was stirred continuously and cooled by means of an ice-water bath. After an additional four and one-half hours, titration for peracetic acid indicated the reaction was 98.3 percent complete. The solution was then fed into excess ethylbenzene, and refluxed at a pressure of 35 millimeters of mercury and thereby concentrated to a residue of 248 grams. After being seeded and standing in the cold for several days, approximately twenty grams of crystals deposited which were removed by filtration. Analysis for acetic acid by titration with 0.5 N NaOH indicated an equivalent weight of 199 and double bond equivalent weight by bromine number was 203. The equivalent weight calculated for $C_{10}H_{13}O_3N$-(2-methyl-5-vinylpyridinium N-oxide acetate) was 195.

A portion of the filtrate from the crystalline 2-methyl-5-vinylpyridinium N-oxide acetate was reacted with picric acid to form the picrate salt. Additionally, the 2-methyl-5-vinylpyridinium N-oxide acetate, when reacted with picric acid, also gave the same picrate salt. The melting point and mixed melting points were from 91.5 to 93° C. Analysis: calculated percentages for $C_{14}H_{12}O_8N_{14}$ (picrate of 2-methyl-5-vinylpyridine N-oxide), carbon: 46.2, hydrogen: 3.3, nitrogen: 15.4; found: carbon: 46.0, hydrogen, 3.7, nitrogen: 12.8.

EXAMPLE III

*Preparation of 2-Methyl-5-Vinylpyridine N-Oxide and Isolation of the Dihydrate*

357 grams of 2-methyl-5-vinylpyridine (3.0 moles) having a refractive index of $n\ 30/D = 1.5396$ was treated with an ethyl acetate solution containing 250.9 grams of peracetic acid (3.3 moles) over a period of four hours. The reaction temperature was maintained at 25° C. by means of an ice-water bath. After an additional three and one-half hours titration for peracetic acid indicated a conversion of 98.5 percent. Volatile components of the reaction mixture were removed by codistillation with ethylbenzene at reduced pressure, down to a final kettle temperature of 50° C. at a pressure of 5 millimeters of mercury. A residue of 588 grams of crude 2-methyl-5-vinylpyridinium N-oxide acetate remained. A 50 gram portion of this residue was added quickly at 0° C. to 50 grams of a 20 percent by weight aqueous sodium hydroxide solution depositing 40 grams of 2-methyl-5-vinylpyridine N-oxide dihydrate, a tan solid with a melting point of 41–44° C. The yield was 92 percent of the theoretical. A sample of the dihydrate was recrystallized rapidly from cold water giving white crystals having a melting point of 40–42° C. and the following analysis: percentages calculated for $C_8H_9ON \cdot (H_2O)_2$: carbon: 56.1, hydrogen: 7.6 water: 21.0; found: carbon: 56.6, hydrogen: 8.1, water: 21.3 (Karl Fischer). The picrate salt prepared from the dihydrate exhibited a melting point and mixed melting point with the picrate of Example II of 93.5–94° C.

The foregoing detailed description has been given for clearness of understanding of the present invention and

What is claimed is:
1. A process for preparing vinylpyridine N-oxides of the formula:

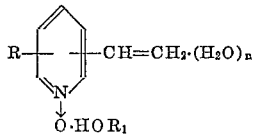

wherein R is a member selected from the class consisting of hydrogen and lower alkyl groups; $R_1$ is a member selected from the class consisting of hydrogen, picryl and acetyl groups; and $n$ has a value of from 0 to 1 with the provision that when $n$ equals 1, $R_1$ must be hydrogen; which comprises the steps of reacting a solution of vinylpyridine with an organic peracid at a temperature of from about $-20°$ to about $50°$ C., to form the vinylpyridine N-oxide; concentrating said solution containing the vinylpyridine N-oxide in the presence of acetic acid to form the vinylpyridinium N-oxide acetate; separating said acetate from said solution and reacting said vinylpyridinium N-oxide acetate with a solution containing a member selected from the group consisting of an alkaline hydroxide and picric acid.

2. A process for preparing a vinylpyridinium N-oxide acetate of the formula:

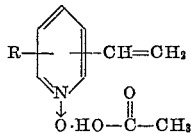

wherein R is a member selected from the group consisting of hydrogen and lower alkyl groups which comprises the steps of reacting a solution of a vinylpyridine with an organic peracid at a temperature of from about $-20°$ to about $50°$ C., to form the vinylpyridine N-oxide; concentrating said solution containing the vinylpyridine N-oxide in the presence of acetic acid and recovering the vinylpyridinium N-oxide acetate.

3. A process for preparing a vinylpyridinium N-oxide dihydrate of the formula:

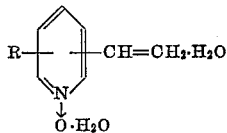

wherein R is a member selected from the group consisting of hydrogen and lower alkyl groups which comprises the steps of reacting a solution of a vinylpyridine with an organic peracid at a temperature of from about $-20°$ to about $50°$ C., to form the vinylpyridine N-oxide; concentrating said solution containing the vinylpyridine N-oxide in the presence of acetic acid to form the vinylpyridinium N-oxide acetate; separating said acetate from said solution and reacting said vinylpyridinium N-oxide acetate with a sodium hydroxide solution and recovering the vinylpyridinium N-oxide dihydrate.

4. A process for preparing a vinylpyridinium N-oxide picrate of the formula:

wherein R is a member selected from the group consisting of hydrogen and lower alkyl groups which comprises the steps of reacting a solution of a vinylpyridine with an organic peracid at a temperature of from about $-20°$ to about $50°$ C., to form the vinylpyridine N-oxide; concentrating said solution containing the vinylpyridine N-oxide in the presence of acetic acid to form the vinylpyridinium N-oxide acetate; separating said acetate from said solution and reacting said vinylpyridinium N-oxide acetate with a picric acid solution and recovering the vinylpyridinium N-oxide picrate.

References Cited in the file of this patent
UNITED STATES PATENTS

| | | |
|---|---|---|
| 2,169,976 | Guenther et al. | Aug. 15, 1939 |
| 2,749,349 | Cislak | June 15, 1956 |

OTHER REFERENCES

Elderfield: Heterocyclic Compounds, vol. 1, pp. 412–414 (1950).

Katritsky et al.: J. Chem. Soc. (London), 1958, pp. 150–2.